US012803417B2

(12) United States Patent
Xu et al.

(10) Patent No.: US 12,803,417 B2
(45) Date of Patent: Nov. 17, 2026

(54) CONTROL CIRCUIT AND METHOD OF A SINGLE-MODE DUAL-CURRENT-PATH STEP-DOWN/STEP-UP CONVERTER

(71) Applicant: HEFEI CLT MICROELECTRONICS CO. LTD, Hefei (CN)

(72) Inventors: Weiwei Xu, Hefei (CN); Ji Jin, Hefei (CN); Weiwei Huang, Hefei (CN)

(73) Assignee: HEFEI CLT MICROELECTRONICS CO. LTD, Hefei (CN)

( * ) Notice: Subject to any disclaimer, the term of this patent is extended or adjusted under 35 U.S.C. 154(b) by 176 days.

(21) Appl. No.: 18/797,577

(22) Filed: Aug. 8, 2024

(65) Prior Publication Data

US 2025/0226746 A1 Jul. 10, 2025

Related U.S. Application Data

(63) Continuation of application No. PCT/CN2024/075501, filed on Feb. 2, 2024.

(30) Foreign Application Priority Data

Jan. 17, 2024 (CN) ......................... 202410063372.2

(51) Int. Cl.

*H02M 1/00* (2007.01)
*H02M 3/07* (2006.01)
*H02M 3/158* (2006.01)

(52) U.S. Cl.

CPC ........... *H02M 1/0095* (2021.05); *H02M 3/07* (2013.01); *H02M 3/1582* (2013.01); *H02M 1/0054* (2021.05)

(58) Field of Classification Search

CPC ......... H02M 1/0095; H02M 3/07–078; H02M 3/1582

See application file for complete search history.

(56) References Cited

U.S. PATENT DOCUMENTS 6,198,645 B1 3/2001 Kotowski et al.
2012/0274295 A1 11/2012 Lin et al.

(Continued)

FOREIGN PATENT DOCUMENTS

CN 103259402 A 8/2013
CN 114285280 A 4/2022

(Continued)

OTHER PUBLICATIONS

Machine translation of CN 114285280. Obtained from http://worldwide.espacenet.com on Mar. 2, 2026. (Year: 2022).*

(Continued)

*Primary Examiner* — Fred E Finch, III

(74) *Attorney, Agent, or Firm* — Cooper Legal Group, LLC

(57) ABSTRACT

The present application discloses a control circuit and method of a single-mode dual-current-path step-down/step-up converter, including: during a charging period of an inductor, controlling a first switch, a fourth switch and a fifth switch to close, and controlling a second switch, a third switch and a sixth switch to open, so as to discharge a first capacitor and a second capacitor, and increase a current of the inductor; during a discharging period of the inductor, controlling the first, the fourth and the fifth switches to open, and controlling the second, the third switch and the sixth switches to close, so as to charge the first and second capacitor, and reduce the current of the inductor.

7 Claims, 5 Drawing Sheets

(56) References Cited

U.S. PATENT DOCUMENTS

| | | | | |
|---|---|---|---|---|
| 2019/0341850 | A1 | 11/2019 | Macri | |
| 2021/0234462 | A1 * | 7/2021 | Cannillo | G05F 1/595 |
| 2022/0115947 | A1 * | 4/2022 | Huh | H02M 1/008 |
| 2023/0026364 | A1 * | 1/2023 | Kulkarni | H02M 3/158 |
| 2023/0268835 | A1 * | 8/2023 | Lesso | H02M 3/07<br>323/271 |
| 2023/0353054 | A1 * | 11/2023 | Hardy | H02M 1/15 |
| 2024/0063716 | A1 * | 2/2024 | De Marco | H02M 1/0095 |
| 2024/0356436 | A1 * | 10/2024 | Xu | H02M 1/0095 |
| 2025/0211105 | A1 * | 6/2025 | Yu | H02M 3/155 |

FOREIGN PATENT DOCUMENTS

| | | | |
|---|---|---|---|
| CN | 116131602 | A | 5/2023 |
| DE | 102020213005 | A1 | 4/2022 |
| EP | 4203283 | A1 | 6/2023 |
| WO | 2023097866 | A1 | 6/2023 |
| WO | 2023102740 | A1 | 6/2023 |

OTHER PUBLICATIONS

International Search Report received in corresponding International Patent Application No. PCT/CN2024/075501, mailed Sep. 6, 2024, 4 pages.

First Office Action received in corresponding Chinese patent application No. 202410063372.2, dated Feb. 26, 2024, 18 pages.

Zhang, J., et al., "An Efficient Step-up and Step-down Dual-output Charge Pump Controlled by Finite State Machine", Research & Progress of SSE, Jun. 2010, vol. 30, No. 2, pp. 262-268, with English abstract.

* cited by examiner

CONTROL CIRCUIT AND METHOD OF A SINGLE-MODE DUAL-CURRENT-PATH STEP-DOWN/STEP-UP CONVERTER

CROSS-REFERENCE TO RELATED APPLICATION

This application is a continuation of PCT application serial no. PCT/CN2024/075501, filed on Feb. 2, 2024, which claims the priority and benefit of Chinese patent application serial no. 202410063372.2, filed on Jan. 17, 2024. The entireties of PCT application serial no. PCT/CN2024/075501 and Chinese patent application serial no. 202410063372.2 are hereby incorporated by reference herein and made a part of this specification.

TECHNICAL FIELD

The present application relates to a technical field of converter control, and in particular, relates to a control circuit and method of a single-mode dual-current-path step-down/step-up converter.

BACKGROUND ART

With a development of a mobile electronic technology, a lithium battery is widely used in a mobile device due to high energy density and high power density characteristics. However, with prolonged time of use, a voltage of the lithium battery will decrease from an initial 4.2V to 2.5V. And most mobile devices have a concentrated demand for power supply voltage around 3.4V. In order to prolong a battery life as much as possible, a step-down/step-up direct-current-to-direct current (DC-DC) converter with a long battery life and both step down and step up functions is widely adopted.

A traditional single mode step-down/step-up converter cascades a traditional step up converter and a step down converter, therefore, on a power path, referring to FIG. 1, there will always be two switches in series with an inductor, while a simple step up converter or step down converter only has one switch in series with the inductor, and the inductor current will always be higher than a load current at an output end, resulting in a significant conduction loss for a traditional step-down/step-up converter. In order to reduce the loss on the inductor, the inductor with smaller Direct Current Resistance (DCR) must be selected, however the smaller the DCR, larger an inductor size will be, which not only further increases a size of a chip but also increases a cost.

On this basis, in order to reduce the inductor current, a new topology structure for a single mode step-down/step-up converter is provided in related technologies, referring to FIG. 2, the structure introduces 8 switches and two flying capacitors, compared with traditional single mode step-down/step-up converter, the inductor current of the structure during operation is significantly reduced, reducing a requirement of the converter for inductor size, therefore, a small volume and large DCR inductor can be used to achieve a reduction in conduction loss. Although the structure can reduce the conduction loss by reducing the inductor current, some switches in the structure require an use of high voltage withstand switches, which will lead to an increase in conduction loss at the switch, resulting in a decrease in an overall efficiency of the chip and an increase in cost.

In summary, the single mode step-down/step-up converter of related technologies, due to its inability to balance a high voltage withstand of the switch and a high inductor current, resulting in lower overall efficiency and higher cost of the chip.

SUMMARY

This application provides a control circuit and method of a single-mode dual-current-path step-down/step-up converter. By optimizing the structural relationship between a flying capacitor and a switch, the step-up and step-down functions are achieved. Compared with the topology structure in related technologies, it can reduce the number of switches used and avoid the use of high-voltage switches while reducing the inductor current, thus balancing the problems of high inductor current and high voltage resistance of switches, achieving a reduction in chip cost while improving the overall efficiency of the chip.

In a first aspect, the present application provides a control circuit of a single-mode dual-current-path step-down/step-up converter including a first switch, a second switch, a third switch, a fourth switch, a fifth switch, a sixth switch, a first capacitor, a second capacitor and an inductor, the first capacitor and the second capacitor are flying capacitors, wherein:

- a first end of the first switch is connected to a first end of the second switch and a voltage input end, a second end of the second switch is connected to a first end of the first capacitor, and a second end of the first switch is connected to a second end of the first capacitor;
- a first end of the third switch is connected to the second end of the first capacitor, and a second end of the third switch is grounded;
- a first end of the inductor is connected to the first end of the first capacitor, a second end of the inductor is connected to a first end of the fourth switch, and a second end of the fourth switch is connected to a voltage output end;
- a first end of the second capacitor is connected to the second end of the inductor, a second end of the second capacitor is connected to a first end of the fifth switch, a second end of the fifth switch is grounded;
- a first end of the sixth switch is connected to the second end of the second capacitor, and a second end of the sixth switch is connected to the second end of the fourth switch.

Optionally, the control circuit further includes an output capacitor and an output resistor, wherein:

- a first end of the output capacitor is connected to the voltage output end, and a second end of the output capacitor is grounded;
- a first end of the output resistor is connected to the voltage output end, and a second end of the output resistor is grounded.

Optionally, the control circuit further includes a third capacitor and a seventh switch, wherein:

- a first end of the third capacitor is connected to the voltage input end, a second end of the third capacitor is connected to a first end of the seventh switch, and a second end of the seventh switch is connected to the first end of the inductor.

Optionally, the control circuit further includes a fourth capacitor and an eighth switch, wherein:

- a first end of the eighth switch is connected to the second end of the inductor, a second end of the eighth switch is connected to a first end of the fourth capacitor, and a second end of the fourth capacitor is connected to the second end of the fourth switch.

Optionally, the control circuit further includes a third capacitor, a fourth capacitor, a seventh switch and an eighth switch, wherein:

a first end of the third capacitor is connected to the voltage input end, a second end of the third capacitor is connected to a first end of the seventh switch, and a second end of the seventh switch is connected to the first end of the inductor;

a first end of the eighth switch is connected to the second end of the inductor, a second end of the eighth switch is connected to a first end of the fourth capacitor, and a second end of the fourth capacitor is connected to the second end of the fourth switch.

In a second aspect, the present application provides a control method of the single-mode dual-current-path step-down/step-up converter, including:

during a charging period of the inductor, controlling the first switch, the fourth switch, and the fifth switch to close, controlling the second switch, the third switch, and the sixth switch to open, so as to discharge the first capacitor and the second capacitor, and increase a current of the inductor;

during a discharging period of the inductor, controlling the first switch, the fourth switch, and the fifth switch to open, controlling the second switch, the third switch, and the sixth switch to close, so as to charge the first capacitor and the second capacitor, and reduce the current of the inductor.

By adopting the above technical solution, by optimizing a structural relationship between the flying capacitors and the switches, step up and step down functions can be achieved, comparing with a topology structure in related technologies, it can reduce a number of switches used and avoid using high voltage withstand switches while reducing a current of the inductor. thereby balancing a problem of high current of the inductor and high voltage withstand of switches, and improve an overall efficiency of a chip.

Optionally, the control method includes:

during the charging period of the inductor, controlling the seventh switch to close to generate a first supply voltage at the second end of the third capacitor, a voltage value of the first supply voltage is twice that of a voltage value of the voltage input end.

Optionally, the control method includes:

during the discharging period of the inductor L, controlling the eighth switch to close to generate a second supply voltage at the first end of the fourth capacitor, a voltage value of the second supply voltage is twice that of a voltage value of the voltage output end.

In summary, the present application includes at least one of the following beneficial technical effects:

1. By optimizing the structural relationship between the flying capacitors and the switches, the step up and step down functions can be achieved, comparing with the topology structure in related technologies, it can reduce the number of switches used and avoid using high voltage withstand switches while reducing the current of the inductor, thereby balancing the problem of high current of the inductor and high voltage withstand of switches, and improve the overall efficiency of the chip.

2. By utilizing an energy storage characteristic of the flying capacitors, a return circuit that can output twice an output voltage and/or output voltage is designed to drive a MOS tube as a switch, there is no need to configure an independent step up circuit separately, which can effectively reduce a system cost and complexity. At the same time, it also increases a universality of the control circuit of the single-mode dual-current-path step-down/step-up converter, making it not only suitable for ordinary step up and step down conversion, but also convenient for supplying power to a driving circuit.

DETAILED DESCRIPTION

In order to enable personnel in a technical field to better understand the technical solutions in the specification, the following will provide a clear and complete description of the technical solutions in the embodiments of the specification in conjunction with the accompanying drawings. Obviously, the described embodiments are only a part of the embodiments of the present application, not all of them.

In a description of the embodiments of the present application, words such as “illustrative”, “for example” or “for instance”, are used as example, example illustration, or explanation. Any embodiments or designs described as “illustrative”, “for example” or “for instance” in the present application shall not be construed as being more preferred or advantageous than other embodiments or designs. Specifically, the use of words such as “illustrative”, “for example” or “for instance” is intended to present relevant concepts in a concrete manner.

In the description of the embodiment in the present application, the term “multiple” refers to two or more. For example, multiple systems refer to two or more systems, and multiple screen terminals refer to two or more screen terminals. In addition, the terms “first” and “second” are only used to describe a purpose and cannot be understood as indicating or implying relative importance or implying the indicated technical features. Therefore, the features limited to “first” and “second” can explicitly or implicitly include one or more of these features. The terms “including”, "containing", "having", and their variations all mean "including but not limited to", unless otherwise emphasized otherwise.

Figure 1:
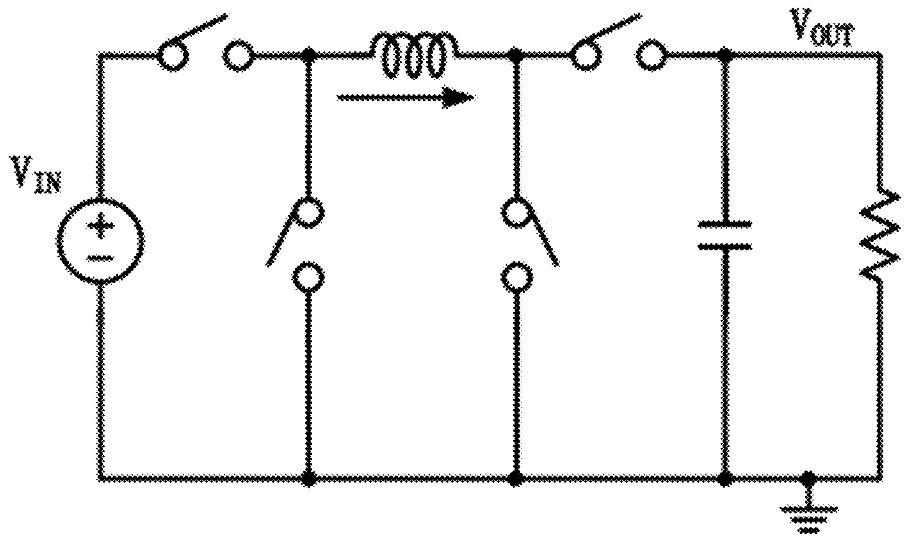
FIG. 1 (Prior art)
FIG. 1 is a schematic structure diagram of a traditional single mode step-down/step-up converter provided in related technologies.
Figure 2:
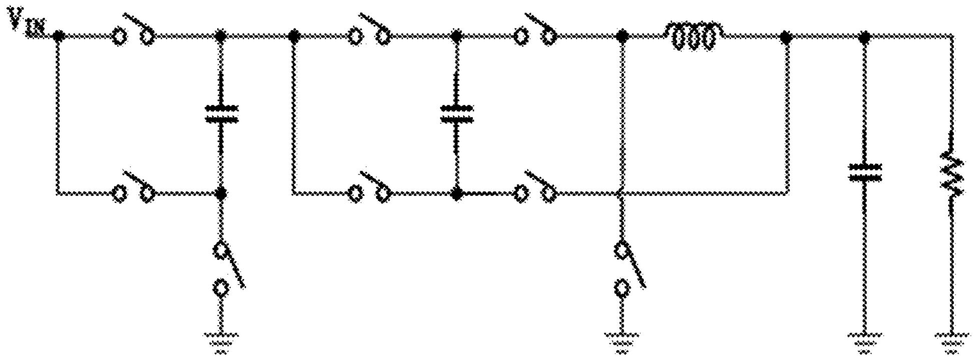
FIG. 2 (Prior art)
FIG. 2 is a schematic structure diagram of a new topology structure of the single mode step-down/step-up converter provided in related technologies.

Firstly, a current of an inductor L in related technologies are further analyzed in connection with FIGS. 1 and 2.

A circuit structure of a traditional single mode step-down/step-up converter is shown in FIG. 1, which includes four switches, an inductor L, and a capacitor.

Balancing the inductor L yields:

$$DV_{IN}=(1-D)V_{out};$$

$$M_1=\frac{V_{out}}{V_{IN}}=\frac{D}{1-D};$$

where D is a duty cycle, $V_{IN}$ is a supply voltage, $V_{out}$ is an output voltage, $M_1$ is a voltage conversion ratio of the circuit structure of the traditional single mode step-down/step-up converter shown in FIG. 1.

Therefore, the average current of the inductor L is:

$$I_{L1}=\frac{1}{1-D}I_{out}=(M_1+1)I_{out};$$

where $D\in(0, 1)$, $M_1\in(0, \infty)$, $L_{L1}$ is the average current of the inductor L in the circuit structure of the traditional single mode step-down/step-up converter shown in FIG. 1, and $I_{OUT}$ is a load current.

From this, it can be seen that the average current of the inductor L is always greater than the load current. Since a conduction loss is proportional to a square of the current of the inductor L, the current of the inductor L higher than the load current will lead to unnecessary losses, thereby reducing an overall efficiency of a system.

Based thereon, FIG. 2 shows a new topology structure of a single mode step-down/step-up converter.

When the inductor L is in a magnetized state, a voltage at an input end of the inductor L is $3V_{IN}-V_{out}$, the voltage at the output end of inductor L is $V_{out}$, therefore, the voltage at two ends of the inductor L during magnetization is $3V_{IN}-2V_{out}$.

When the inductor L is in a demagnetized state, the voltage at the input end of the inductor L is 0, and the voltage at the output end of the inductor L is $V_{out}$, therefore, the voltage at two ends of the inductor L during magnetization is $V_{out}$.

Balancing the inductor L yields:

$$D(3V_{IN}-V_{out}-V_{out})=(1-D)V_{out};$$

$$M_2=\frac{V_{out}}{V_{IN}}=\frac{3D}{1+D}$$

where D is the duty cycle, $V_{IN}$ is the supply voltage, $V_{out}$ is the output voltage, $M_2$ is the voltage conversion ratio of the circuit structure of the single mode step-down/step-up converter shown in FIG. 2.

Therefore, the average current of the inductor L is:

$$I_{L2}=(3-M_2)/3I_{OUT};$$

where $D\in(0, 1)$, $M_2\in(0, 1.5)$, $I_{L2}$ is the average current of the inductor L of the new topology structure of the single mode step-down/step-up converter shown in FIG. 2, and $I_{OUT}$ is the load current. According to a range of $M_2$, the range of the average current $I_{L2}$ of the inductor L can be obtained as $(0.5, 1)I_{OUT}$.

Comparing with the traditional single mode step-down/step-up DC-DC converter, the current of the inductor L reduces significantly, significantly reducing a demand of the system for a size of the inductor L, a small and large DCR inductor L can be used to achieve higher efficiency.

However, due to an use of 8 switches and the switches need to withstand a higher voltage, a high voltage withstand switch is required for a practical application, which can lead to increased conduction and switching losses of the switch. For an overall chip, although it can reduce the current of the inductor L and use a large DCR inductor L to reduce the conduction loss of the inductor L, use of the high voltage withstand switch will increase the conduction loss, resulting in a decrease in overall system efficiency.

In view of the above problems, an embodiment of the present application provides a control circuit and method for a single-mode dual-current-path step-down/step-up converter, which achieves a reduction in the current of the inductor L under all working conditions, reduces the conduction loss of a switch, while solving a step-down problem, thereby improving an efficiency of the chip.

In addition, since the present application eliminate the use of the high voltage withstand switches while using a small-volume and large-DCR resistors, a chip area and lower a chip cost can be reduced.

Figure 3:
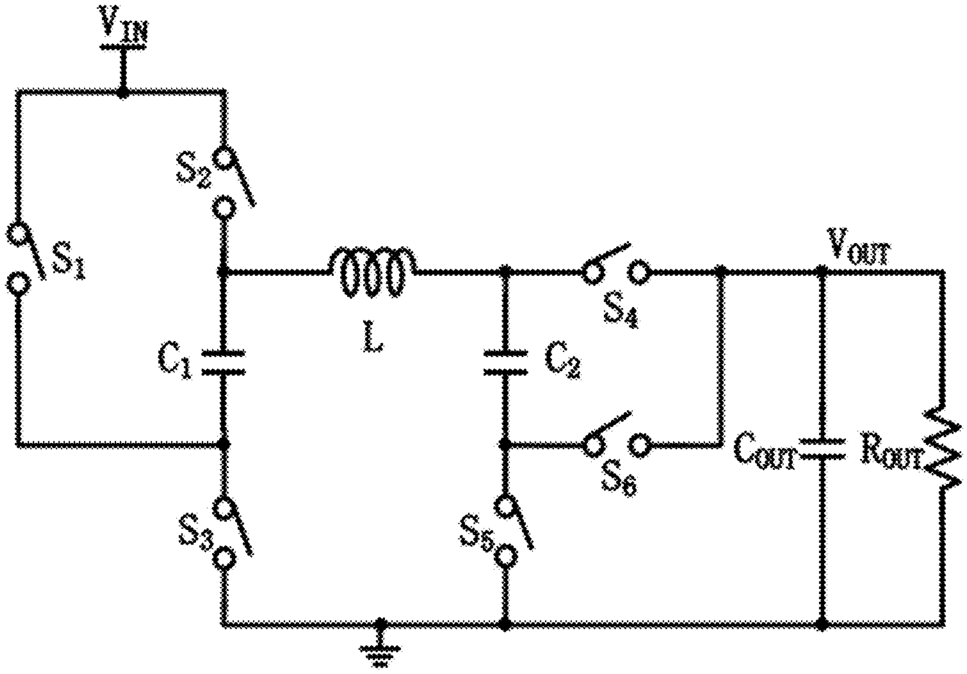
FIG. 3 is a schematic structure diagram of a control circuit structure of a single-mode dual-current-path step-down/step-up converter provided in an embodiment of the present application.

Referring to FIG. 3 showing a schematic structure diagram of a control circuit structure of the single-mode dual-current-path step-down/step-up converter provided in an embodiment of the present application, it shows the control circuit for the single-mode dual-current-path step-down/step-up converter, which includes a first switch S1, a second switch S2, a third switch S3, a fourth switch S4, a fifth switch S5, a sixth switch S6, a first capacitor C1, a second capacitor C2, and the inductor L, the first capacitor C1 and the second capacitor C2 are flying capacitors, wherein:

A first end of the first switch S1 is connected to a first end of the second switch S2 and a voltage input end, a second end of the second switch S2 is connected to a first end of the first capacitor C1, and a second end of the first switch S1 is connected to a second end of the first capacitor C1; a first end of the third switch S3 is connected to the second end of the first capacitor C1, and a second end of the third switch S3 is grounded; a first end of the inductor L is connected to the first end of the first capacitor C1, a second end of the inductor L is connected to a first end of the fourth switch S4, and a second end of the fourth switch S4 is connected to a voltage output end; a first end of the second capacitor C2 is connected to the second end of the inductor L, a second end of the second capacitor C2 is connected to a first end of the fifth switch S5, and a second end of the fifth switch S5 is grounded; a first end of the sixth switch S6 is connected to the second end of the second capacitor C2, and a second end of the sixth switch S6 is connected to the second end of the fourth switch S4.

A flying capacitor refers to a capacitor connected between at least two switching nodes in a switching power supply or converter, configured for storing and transmitting energy. In an embodiment of the present application, it can be understood that before and after a PWM waveform transformation causes the switch to change, a voltage isolation conversion is achieved through an energy storage function of the flying capacitor.

By controlling a conduction or closure of the first switch S1, the second switch S2, the third switch S3, the fourth switch S4, the fifth switch S5, and the sixth switch S6, a dual current path is formed around the inductor L. By controlling a ratio of a charging and discharging duration of the inductor L within one cycle, an input voltage can be increased and decreased to provide an output voltage that meets the requirements of mobile devices for power supply voltage.

A specific working principle is as follow: during a charging period of the inductor L, controlling the first switch S1, the fourth switch S4, and the fifth switch S5 to close, and controlling the second switch S2, the third switch S3, and the sixth switch S6 to open, so as to discharge the first capacitor C1 and the second capacitor C2, and increase the current of the inductor L; and during a discharging period of the inductor L, controlling the first switch S1, the fourth switch S4, and the fifth switch S5 to open, controlling the second switch S2, the third switch S3, and the sixth switch S6 to close, so as to charge the first capacitor C1 and the second capacitor C2, and reduce the current of the inductor L.

Next, dividing a working cycle of the inductor L into the charging period of the inductor L and the discharging period of the inductor L, to explain in detail a switching control principle of the inductor L in dual current paths respectively.

Figure 4:
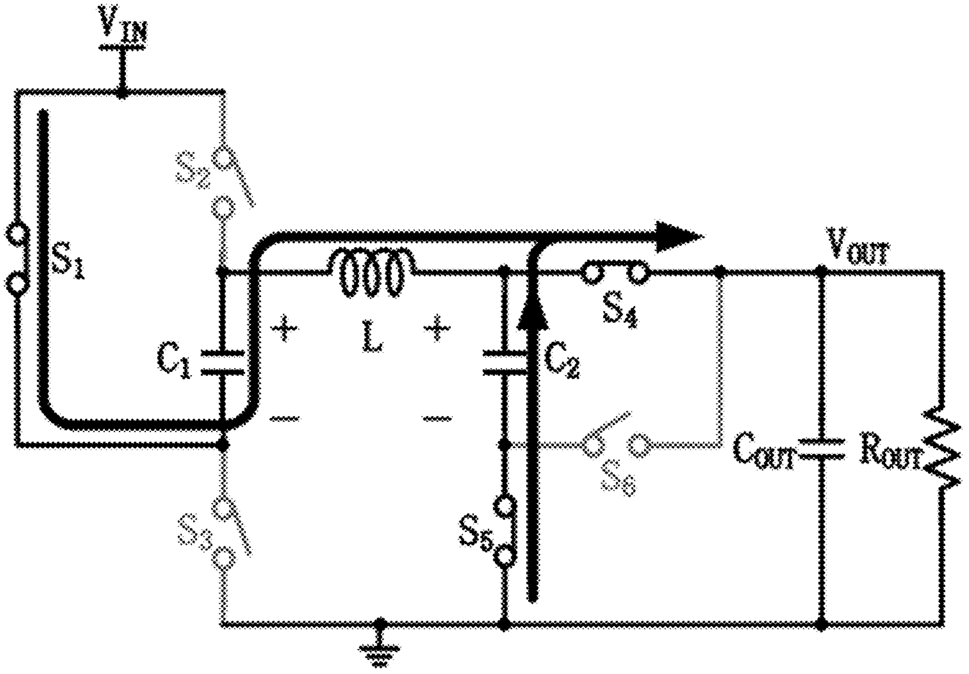
FIG. 4 is a schematic diagram of a principle during a charging period of an inductor provided in an embodiment of the present application.

Referring to FIG. 4, which is a schematic diagram of a principle during the charging period of the inductor L provided in an embodiment of the present application.

During the charging period of the inductor L, controlling the first switch S1, the fourth switch S4, and the fifth switch S5 to close, and controlling the second switch S2, the third switch S3, and the sixth switch S6 to open. Forming a branch of a voltage input-first switch S1-first capacitor C1-inductor L-fourth switch S4-voltage output, and a branch of a second capacitor C2-fourth switch S4-voltage output.

For the first end of the inductor L, the first capacitor C1 discharges, as a discharge direction of the first capacitor C1 is from the first end of the capacitor C1 to the first end of inductor L, the voltage at the first end of the inductor L (i.e. a left side of the inductor L) is the input voltage plus a discharge voltage of the first capacitor C1, the discharge voltage of the first capacitor C1 is equal to the input voltage, so the voltage at the first end of the inductor L is twice the input voltage $2V_{IN}$.

For the second end of the inductor L, the second capacitor C2 discharges, and the discharge direction is from the first end to an output end of the second capacitor C2. The voltage at the discharge of the first end of the second capacitor C2 is equal to the voltage at the output end, the voltage at the discharge of the second end of the second capacitor C2 is zero, so the voltage at the second end of the inductor L is the output voltage $V_{OUT}$.

Comparing the voltage at the first end with the voltage at the second end of the inductor L, the voltage at the first end is greater than the voltage at the second end, the inductor L is magnetized, and the current of the inductor L increases.

Figure 5:
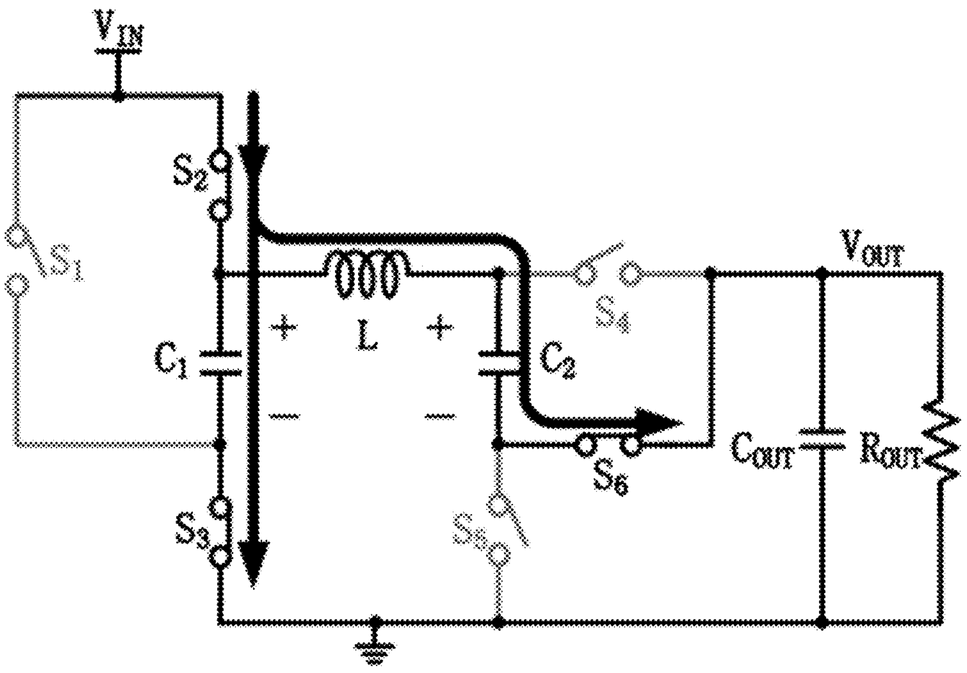
FIG. 5 is a schematic diagram of the principle during a discharging period of the inductor provided in an embodiment of the present application.

Referring to FIG. 5, which is a schematic diagram of the principle during the discharging period of the inductor L provided in an embodiment of the present application.

During the discharging period of the inductor L, the second switch S2, the third switch S3, and the sixth switch S6 are controlled to open and close, and the first switch S1, the fourth switch S4, and the fifth switch S5 are controlled to open. A branch of a voltage input-second switch S2-first capacitor C1 and a branch of an inductor L-second capacitor C2-sixth switch S6-voltage output are formed.

For the first end of the inductor L, the first capacitor C1 charges, the input voltage charges the first capacitor C1 through the second switch S2, the voltage at the first end of the inductor L is pulled to the input voltage $V_{IN}$, For the second end of the inductor L, the second capacitor C2 charges, the voltage at the second end is equal to the voltage at the output end of the second capacitor C2, therefore, the voltage at the first end of the second capacitor C2 (i.e. the second end of the inductor L) is twice the output voltage $2V_{OUT}$.

Comparing the voltage at the first end with the voltage at the second end of the inductor L, the voltage at the first end is lower than the voltage at the second end, the inductor L is demagnetized, and the current of the inductor L decreases.

Analyzing a complete working cycle of the inductor L, first performing volt second balance on the inductor L, and obtain:

$$D(2V_{IN}-V_{OUT})=(1-D)(2V_{OUT}-V_{IN});$$

$$M_3=\frac{V_{OUT}}{V_{IN}}=\frac{1+D}{2-D};$$

where D is the duty cycle, $V_{out}$ is the output voltage, $V_{IN}$ is the input voltage, $M_3$ is the voltage conversion ratio of the control circuit of the single-mode dual-current-path step-down/step-up converter provided in an embodiment of the present application, as shown in FIG. 3. $D\in(0, 1)$, $M_3\in(0.5, 2)$.

Figure 6:
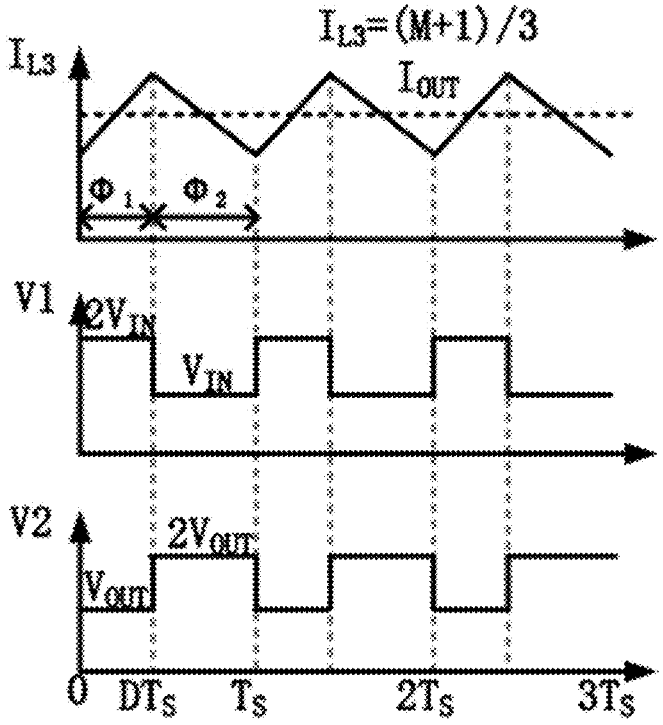
FIG. 6 is a waveform schematic diagram of an inductor state provided in an embodiment of the present application.

Reference is made to FIG. 6, which is a waveform schematic diagram of an inductor state provided in an embodiment of the present application. In FIG. 6, $I_{L3}$ is the current of the inductor L, V1 is the voltage at the first end of the inductor L, and V2 is the voltage at the second end of the inductor L, $\Phi_1$ is a duration of the inductor L during charge stage, and $\Phi_2$ is a duration of a battery during discharge stage.

Due to the fact that during discharge stage of the inductor L, both the inductor L and the second capacitor C2 current paths simultaneously supplement charges to the output end, and the circuit of the inductor L decreases, therefore, the average current of the inductor L is:

$$I_{L3}=\frac{1}{2-D}I_{OUT}=\frac{M_3+1}{3}I_{OUT};$$

where $I_{L3}$ is the average current of the inductor L in the control circuit of the single-mode dual-current-path step-down/step-up converter provided in an embodiment of the present application. According to the range of $M_3$, the range of the average current $I_{L3}$ of the inductor L can be obtained as $(0.5, 1)I_{out}$.

The average current $I_{L1}=(M_1+1)I_{out}$ of the inductor L in the circuit structure of traditional single mode step-down/step-up converter, the average current $$I_{L3}=\frac{M_3+1}{3}I_{OUT}$$

of the inductor L in the control circuit of the single-mode dual-current-path step-down/step-up converter provided in an embodiment of the present application. By contrast, the average current of the inductor L is one-third of the current of the inductor L in the traditional structure in an embodiment of the present application, if the inductor L with a same DCR is selected, the loss ($I_L^2$DCR) on the inductor L is only one-ninth of that of the traditional structure, therefore, the inductor L with a smaller DCR can be used to achieve higher efficiency.

In addition, comparing with the new topology structure of the single mode step-down/step-up converter, the inductor L has the same range of the average current. However, the new topology of the single mode step-down/step-up converter requires eight switches, and all eight switches require high voltage withstand switches, for example, two switches directly connected to the inductor L in FIG. 2, a withstand voltage is $2V_{IN}$ and $3V_{IN}-V_{OUT}$, respectively. The control circuit of the single-mode dual-current-path step-down/step-up converter provided in the present application, with fewer switches (six) used, a withstand voltage value of each switch is $V_{IN}$ or $V_{OUT}$, which can avoid a voltage withstand problem of the switches. Comparing with ordinary switches, the high voltage withstand switches have higher conduction and switching losses, leading to a decrease in overall chip efficiency, therefore, the control circuit of the single-mode dual-current-path step-down/step-up converter provided in the present application can not only save costs but also improve efficiency.

In an embodiment of the present application, the circuit further includes an output capacitor Cout and an output resistor Rout, wherein:

a first end of the output capacitor Cout is connected to the voltage output end, and a second end of the output capacitor Cout is grounded; and a first end of the output resistor Rout is connected to the voltage output end, and a second end of the output resistor Rout is grounded.

In order to ensure an integrity of the circuit structure and a stability of the output voltage, the output resistor Rout and the output capacitor Cout are provided at the output end to form RC parallel grounding.

In practical work, due to frequent switching of the switches, the output voltage will generate certain ripple wave. Providing the output capacitor Cout can absorb this part of the ripple wave, making the output voltage more stable. The first end of the output resistor Rout is also connected to the voltage output end, and the second end is grounded.

Figure 7:
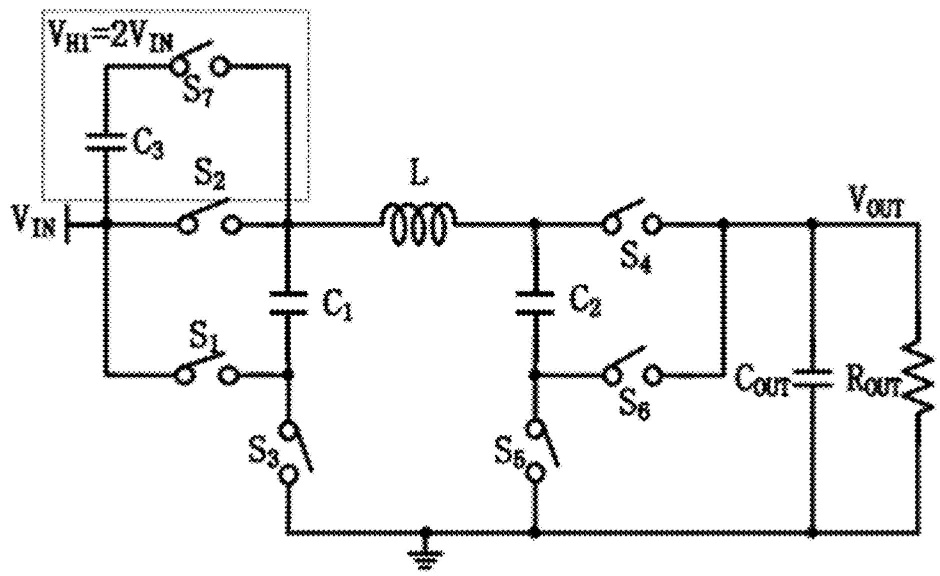
FIG. 7 is a schematic structure diagram of the control circuit structure of another single-mode dual-current-path step-down/step-up converter provided in an embodiment of the present application.

In another embodiment of the present application, reference is made to FIG. 7, which is a schematic structure diagram of the control circuit structure of another single-mode dual-current-path step-down/step-up converter provided in an embodiment of the present application.

A first end of a third capacitor C3 is connected to the voltage input end, a second end of the third capacitor C3 is connected to a first end of a seventh switch S7, and a second end of the seventh switch S7 is connected to the first end of the inductor L; and a first end of an eighth switch S8 is connected to the second end of the inductor L, a second end of the eighth switch S8 is connected to a first end of a fourth capacitor C4, and a second end of the fourth capacitor C4 is connected to the second end of the fourth switch S4.

When using a MOS tube as the switch in practice, a driver driving the MOS tube may require a larger voltage. Therefore, based on an original foundation, the present application utilizes a characteristic of the flying capacitor and a working principle of the circuit to design a return circuit capable of outputting $2V_{IN}$ and/or $2V_{OUT}$, which is configured to power the driver driving the MOS tube. Through a power supply method, there is no need to configure an independent step up circuit, which can effectively reduce system costs and complexity. At the same time, it also enhances a universality of the control circuit of the single-mode dual-current-path step-down/step-up converter, making it not only suitable for ordinary step up and step down conversion, but also convenient for supplying power to a driving circuit.

Specifically, for the convenience of description, a return circuit consisting of the third capacitor C3 and the seventh switch S7 is referred to as a first return circuit. A return circuit consisting of the fourth capacitor C4 and the eighth switch S8 is referred to as a second return circuit.

During the charging period of the inductor L, the seventh switch S7 is closed, and the first return circuit begins to work, the voltage at two ends of the third capacitor C3 is the input voltage plus the voltage of the first capacitor C1, the voltage of the first capacitor C1 is equal to the input voltage, therefore, a voltage of $2V_{IN}$ can be obtained at the third capacitor C3, thereby providing the voltage of $2V_{IN}$ during the charging period of the inductor L within one cycle.

During the discharging period of the inductor L, the eighth switch S8 is closed, and the second return circuit begins to work, the voltage at two ends of the fourth capacitor C4 is the output voltage plus the voltage of the second capacitor C2, the voltage of the second capacitor C2 is equal to the output voltage, therefore, a voltage of $2V_{OUT}$ can be obtained at the fourth capacitor C4, thereby providing the voltage of $2V_{OUT}$ during the discharging period of the inductor L within one cycle.

In summary, when the first return circuit and the second return circuit are connected to the circuit at the same time, controlling the first return circuit to work and controlling the second return circuit not to work during the charging period of the inductor L within one cycle to provide the voltage of $2V_{IN}$; controlling the second return circuit to work and controlling the first return circuit not to work during the discharge period of the inductor L within one cycle to provide the voltage of $2V_{OUT}$.

Optionally, when the first return circuit or the second return circuit is separately connected to the circuit, it can provide a corresponding voltage during the charging or discharging period of the inductor L, and provide the voltage within a remaining period of one cycle, a specific situation is as follows.

Figure 8:
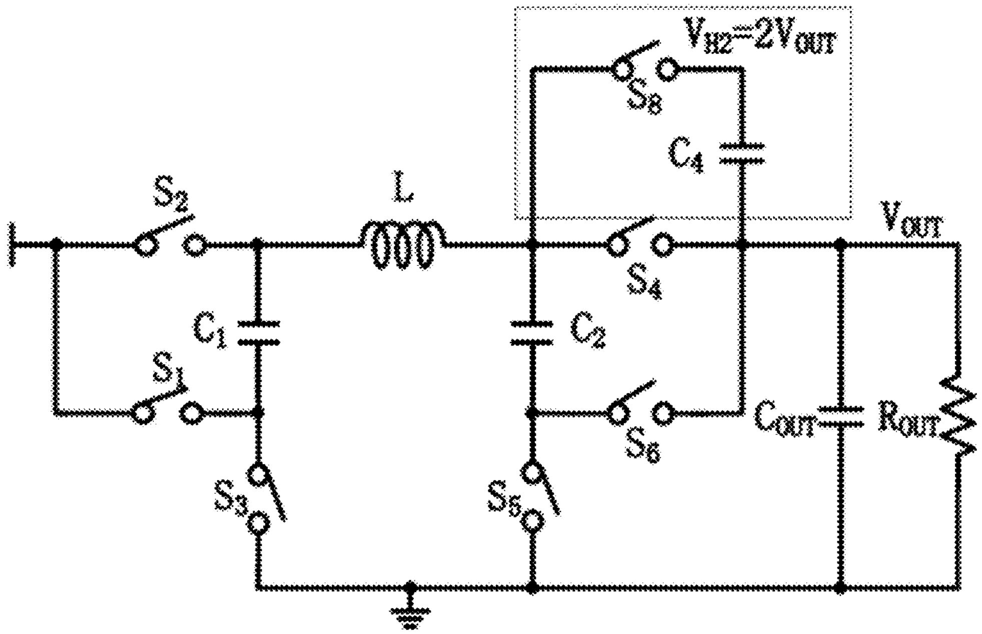
FIG. 8 is a schematic diagram of a principle of providing voltage during the charging period of the inductor provided in an embodiment of the present application.

Referring to FIG. 8, which is a schematic diagram of a principle of providing voltage during the charging period of the inductor L provided in an embodiment of the present application. A detailed connection relationship is that the first end of the third capacitor C3 is connected to the voltage input end, the second end of the third capacitor C3 is connected to the first end of the seventh switch S7, and the second end of the seventh switch S7 is connected to the first end of the inductor L.

During the charging period of the inductor L, controlling the seventh switch S7 to close to generate a first supply voltage at the second end of the third capacitor C3, a voltage value of the first supply voltage is twice that of a voltage value of the voltage input end.

At the first end of the inductor L, the first switch S1 and the seventh switch S7 are closed, the second switch S2 and the third switch S3 are opened, the voltage applied to the third capacitor C3 is the input voltage of the voltage input end and the voltage of the first capacitor C1, At the same time, a withstand voltage value of the seventh switch S7 is $2V_{IN}-V_{IN}=V_{IN}$. where, a function of the third capacitor C3 is same as that of the output capacitor Cout, both of which have a stabilizing effect. So that the first supply voltage can be provided through the first return circuit with the voltage value twice the voltage value of the voltage input end.

During the discharging period of the inductor L, the seventh switch S7 is opened, and no additional voltage is provided.

Figure 9:
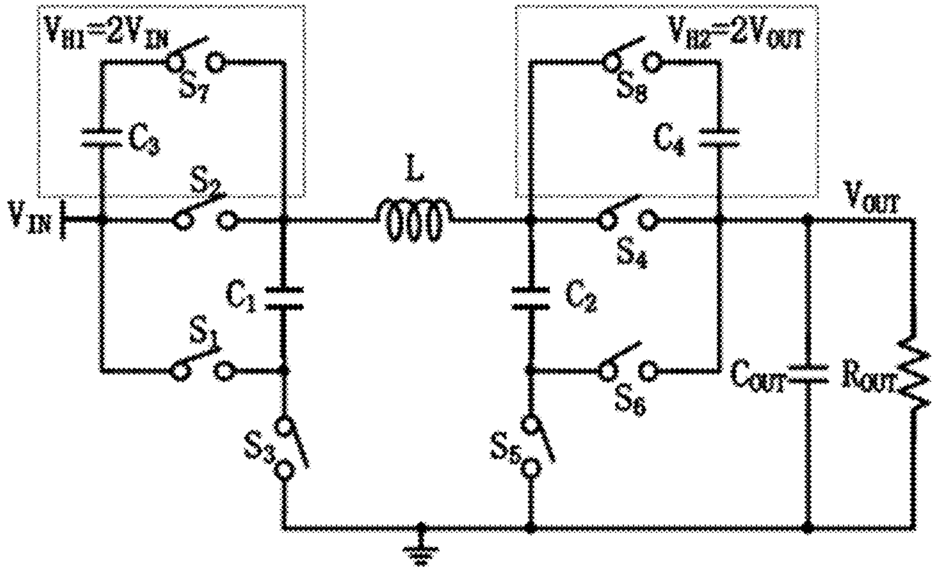
FIG. 9 is a schematic diagram of a principle of providing voltage during the discharging period of the inductor provided in an embodiment of the present application.

Referring to FIG. 9, which is a schematic diagram of the principle of providing voltage during the discharging period of the inductor L provided in an embodiment of the present application. The detailed connection relationship is that the first end of the eighth switch S8 is connected to the second end of the inductor L, the second end of the eighth switch S8 is connected to the first end of the fourth capacitor C4, and the second end of the fourth capacitor C4 is connected to the second end of the fourth switch S4.

During the discharging period of the inductor L, controlling the eighth switch S8 to close to generate a second supply voltage at the first end of the fourth capacitor C4, a voltage value of the second supply voltage is twice that of a voltage value of the voltage output end.

At the second end of the inductor L, the fourth switch S4 and the fifth switch S5 are opened, the sixth switch S6 and the eighth switch S8 are closed, the voltage applied to the fourth capacitor C4 is the voltage of the second end of the inductor L and the voltage at the second capacitor C2, at the same time, a withstand voltage value of the eighth switch S8 is $2V_{OUT}-V_{OUT}=V_{OUT}$. where a function of the fourth capacitor C4 is the same as that of the output capacitor Cout, both of which have the stabilizing effect. So that the second supply voltage can be provided through the second return circuit with the voltage value twice the voltage value of the voltage input end.

During the charging period of the inductor L, the eighth switch S8 is opened, and no additional voltage is provided.

In the above embodiments, the descriptions of each embodiment have their own emphasis. For parts that are not detailed in a certain embodiment, please refer to the relevant descriptions of other embodiments.

The above are only exemplary embodiments disclosed herein and cannot be used to limit the scope of this disclosure. However, all equivalent changes and modifications made in accordance with this public teaching still fall within the scope of this disclosure. After considering the disclosure of the specification and practical truth, technical personnel in this field will easily come up with other implementation solutions disclosed herein. The present application aims to cover any variations, uses, or adaptive changes disclosed herein, which follow the general principles of this disclosure and include common knowledge or customary technical means in the field of this technology that are not disclosed herein.

LIST OF REFERENCE SIGNS

L. Inductor
C1. First Capacitor
C2. Second Capacitor
C3. Third Capacitor
C4. Fourth Capacitor
S1. First Switch
S2. Second Switch
S3. Third Switch
S4. Fourth Switch
S5. Fifth Switch
S6. Sixth Switch
S7. Seventh Switch
S8. Eighth Switch
Cout. Output Capacitor
Rout. Output Resistor

What is claimed is:

1. A control circuit of a single-mode dual-current-path step-down/step-up converter comprising a first switch, a second switch, a third switch, a fourth switch, a fifth switch, a sixth switch, a first capacitor, a second capacitor and an inductor, wherein, the first capacitor and the second capacitor are flying capacitors;

a first end of the first switch is connected to a first end of the second switch and a voltage input end of the control circuit, a second end of the second switch is connected to a first end of the first capacitor, and a second end of the first switch is connected to a second end of the first capacitor;

a first end of the third switch is connected to the second end of the first capacitor, and a second end of the third switch is grounded;

a first end of the inductor is connected to the first end of the first capacitor, a second end of the inductor is connected to a first end of the fourth switch, and a second end of the fourth switch is connected to a voltage output end of the control circuit;

a first end of the second capacitor is connected to the second end of the inductor, a second end of the second capacitor is connected to a first end of the fifth switch, and a second end of the fifth switch is grounded, a first end of the sixth switch is connected to the second end of the second capacitor, and a second end of the sixth switch is connected to the second end of the fourth switch, and a third capacitor and a seventh switch, wherein, a first end of the third capacitor is connected to the voltage input end, a second end of the third capacitor is connected to a first end of the seventh switch, and a second end of the seventh switch is connected to the first end of the inductor.

2. The control circuit of a single-mode dual-current-path step-down/step-up converter according to claim 1, further comprising an output capacitor and an output resistor, wherein, a first end of the output capacitor is connected to the voltage output end, and a second end of the output capacitor is grounded; and a first end of the output resistor is connected to the voltage output end, and a second end of the output resistor is grounded.

3. The control circuit of a single-mode dual-current-path step-down/step-up converter according to claim 1, further comprising a fourth capacitor and an eighth switch, wherein, a first end of the eighth switch is connected to the second end of the inductor, a second end of the eighth switch is connected to a first end of the fourth capacitor, and a second end of the fourth capacitor is connected to the second end of the fourth switch.

4. The control circuit of a single-mode dual-current-path step-down/step-up converter according to claim 1, further comprising a fourth capacitor, and an eighth switch, wherein, a first end of the eighth switch is connected to the second end of the inductor, a second end of the eighth switch is connected to a first end of the fourth capacitor, and a second end of the fourth capacitor is connected to the second end of the fourth switch.

5. A control method of the single-mode dual-current-path step-down/step-up converter, applied to the control circuit according to claim 1, comprising:

during a charging period of the inductor, controlling the first switch, the fourth switch, and the fifth switch to close, and controlling the second switch, the third switch, and the sixth switch to open, so as to discharge the first capacitor and the second capacitor, and increase a current of the inductor; and during a discharging period of the inductor, controlling the first switch, the fourth switch, and the fifth switch to open, and controlling the second switch, the third switch, and the sixth switch to close, so as to charge the first capacitor and the second capacitor, and reduce the current of the inductor.

6. The control method of the single-mode dual-current-path step-down/step-up converter according to claim 5, wherein the control method comprises:

during the charging period of the inductor, controlling the seventh switch to close to generate a first supply voltage at a first end of the third capacitor, wherein a voltage value of the first supply voltage is twice that of a voltage value of the voltage input end.

7. The control method of the single-mode dual-current-path step-down/step-up converter according to claim 5, wherein the control method comprises:

during the discharging period of the inductor, controlling an eighth switch to close to generate a second supply voltage at a first end of a fourth capacitor, wherein a voltage value of the second supply voltage is twice that of a voltage value of the voltage output end.

* * * * *